(12) United States Patent
Cashler

(10) Patent No.: US 9,910,151 B2
(45) Date of Patent: Mar. 6, 2018

(54) RADAR OBJECT DETECTION SYSTEM

(71) Applicant: DELPHI TECHNOLOGIES, INC., Troy, MI (US)

(72) Inventor: Robert J. Cashler, Kokomo, IN (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 449 days.

(21) Appl. No.: 14/663,052

(22) Filed: Mar. 19, 2015

(65) Prior Publication Data

US 2016/0274228 A1    Sep. 22, 2016

(51) Int. Cl.
| | |
|---|---|
| *G01S 13/93* | (2006.01) |
| *G01S 7/40* | (2006.01) |
| *G01S 13/87* | (2006.01) |
| *G01S 13/04* | (2006.01) |

(52) U.S. Cl.
CPC ............ *G01S 13/931* (2013.01); *G01S 7/40* (2013.01); *G01S 13/04* (2013.01); *G01S 13/87* (2013.01); *G01S 13/872* (2013.01); *G01S 2007/4039* (2013.01); *G01S 2013/9378* (2013.01)

(58) Field of Classification Search
CPC ...... G01S 13/04; G01S 13/872; G01S 13/931; G01S 7/40; G01S 13/87; G01S 2013/9378; G01S 2007/4039
See application file for complete search history.

(56) References Cited

U.S. PATENT DOCUMENTS

| | | | | |
|---|---|---|---|---|
| 5,295,551 | A * | 3/1994 | Sukonick | B62D 1/28 180/167 |
| 6,268,803 | B1 * | 7/2001 | Gunderson | B60Q 9/006 180/168 |
| 6,614,387 | B1 * | 9/2003 | Deadman | G01S 13/825 340/435 |
| 6,975,246 | B1 * | 12/2005 | Trudeau | B60T 7/22 180/167 |
| 7,786,849 | B2 * | 8/2010 | Buckley | G08G 1/165 180/271 |
| 9,384,402 | B1 * | 7/2016 | Furman | G06K 9/00805 |
| 9,436,880 | B2 * | 9/2016 | Bos | B60Q 1/00 |
| 9,507,014 | B2 * | 11/2016 | Stelzer | G01S 7/41 |
| 9,594,155 | B2 * | 3/2017 | Cashler | G01S 7/411 |
| 2002/0067287 | A1 * | 6/2002 | Delcheccolo | B60K 31/0008 340/901 |
| 2002/0075138 | A1 * | 6/2002 | Van Rees | B60K 31/0008 340/436 |

(Continued)

FOREIGN PATENT DOCUMENTS

| | | |
|---|---|---|
| EP | 2 581 892 A1 | 4/2013 |
| GB | 2517835 A | 3/2015 |

*Primary Examiner* — Matthew M Barker
(74) *Attorney, Agent, or Firm* — Lawrence D. Hazelton

(57) ABSTRACT

A radar object detection system includes a first sensor and a controller. The first sensor emits a first radar signal toward a first area about a vehicle, and outputs a first signal indicative of detected targets proximate to the vehicle. The controller receives the first signal from the first sensor, determines when a trailer is connected to the vehicle based on the first signal, defines a shadow-zone that corresponds to a first portion of the first area obstructed by the trailer from being viewed by the first sensor, and ignores detected targets within the shadow-zone that are indicated by the first signal.

2 Claims, 2 Drawing Sheets

(56) References Cited

U.S. PATENT DOCUMENTS

| | | | |
|---|---|---|---|
| 2003/0141965 A1* | 7/2003 | Gunderson | B60R 21/013 340/431 |
| 2004/0153244 A1 | 8/2004 | Kellum | |
| 2004/0201495 A1* | 10/2004 | Lim | G08G 1/096716 340/905 |
| 2005/0024258 A1* | 2/2005 | Matsuoka | G01S 13/584 342/70 |
| 2005/0174077 A1 | 8/2005 | Haag et al. | |
| 2006/0181391 A1* | 8/2006 | McNeill | B65G 69/005 340/5.61 |
| 2007/0182528 A1* | 8/2007 | Breed | B60Q 9/008 340/435 |
| 2008/0186204 A1* | 8/2008 | Buckley | G08G 1/165 340/901 |
| 2008/0238636 A1* | 10/2008 | Birging | B60R 25/1004 340/426.1 |
| 2010/0097200 A1* | 4/2010 | Hilsebecher | G01S 7/412 340/436 |
| 2011/0181457 A1* | 7/2011 | Basten | G01B 7/042 342/70 |
| 2013/0027195 A1* | 1/2013 | Van Wiemeersch | B60W 30/12 340/431 |
| 2013/0162461 A1* | 6/2013 | Lucking | G01S 15/878 342/70 |
| 2014/0267688 A1 | 9/2014 | Aich et al. | |
| 2015/0061894 A1* | 3/2015 | Strassberger | G08G 1/161 340/901 |
| 2015/0325126 A1* | 11/2015 | Schwindt | G08G 1/16 701/36 |
| 2016/0041258 A1* | 2/2016 | Cashler | G01S 7/411 342/70 |
| 2016/0101730 A1* | 4/2016 | Shehan | G01S 17/936 340/431 |
| 2016/0274228 A1* | 9/2016 | Cashler | G01S 7/40 |

* cited by examiner

RADAR OBJECT DETECTION SYSTEM

TECHNICAL FIELD OF INVENTION

This disclosure generally relates to a radar object detection system configured to detect targets proximate to a vehicle, and more particularly relates to a system that ignores detected targets located within an occlusion-zone or a shadow-zone which is blocked from being viewed by a radar sensor by a trailer being towed by the vehicle.

BACKGROUND OF INVENTION

It is known to equip a host vehicle with a radar system for detecting objects such as other vehicles proximate to the host vehicle. Such object detection is desirable for detecting, for example, other vehicles in the so called blind spot which is not readily observable by an operator of a vehicle using typical side-view and rear-view mirrors. Such object detection may also be useful to warn the operator of a rapidly approaching vehicle in an adjacent lane, particularly if the operator indicates that a lane-change is about to be executed by, for example, activating a turn-signal indicator. If the host vehicle is towing a trailer, reflections of radar signals by the trailer may cause the system to indicate that a vehicle is present behind the trailer when there is actually only a vehicle forward the trailer. That is, the trailer may act as a reflective surface (i.e. a mirror) for radar energy emitted and detected by a radar sensor. Because of this, the system may sound a false warning indicating that, for example, a vehicle is approaching from the rear when there is actually nothing but some other vehicle traveling forward of the host vehicle and/or forward of the trailer.

SUMMARY OF THE INVENTION

In accordance with one embodiment, a radar object detection system is provided. The system is configured to detect targets proximate to a vehicle. The system includes a first sensor and a controller. The first sensor emits a first radar signal toward a first area about a vehicle, and outputs a first signal indicative of detected targets proximate to the vehicle. The controller receives the first signal from the first sensor, determines when a trailer is connected to the vehicle based on the first signal, defines a shadow-zone that corresponds to a first portion of the first area obstructed by the trailer from being viewed by the first sensor, and ignores detected targets within the shadow-zone that are indicated by the first signal.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
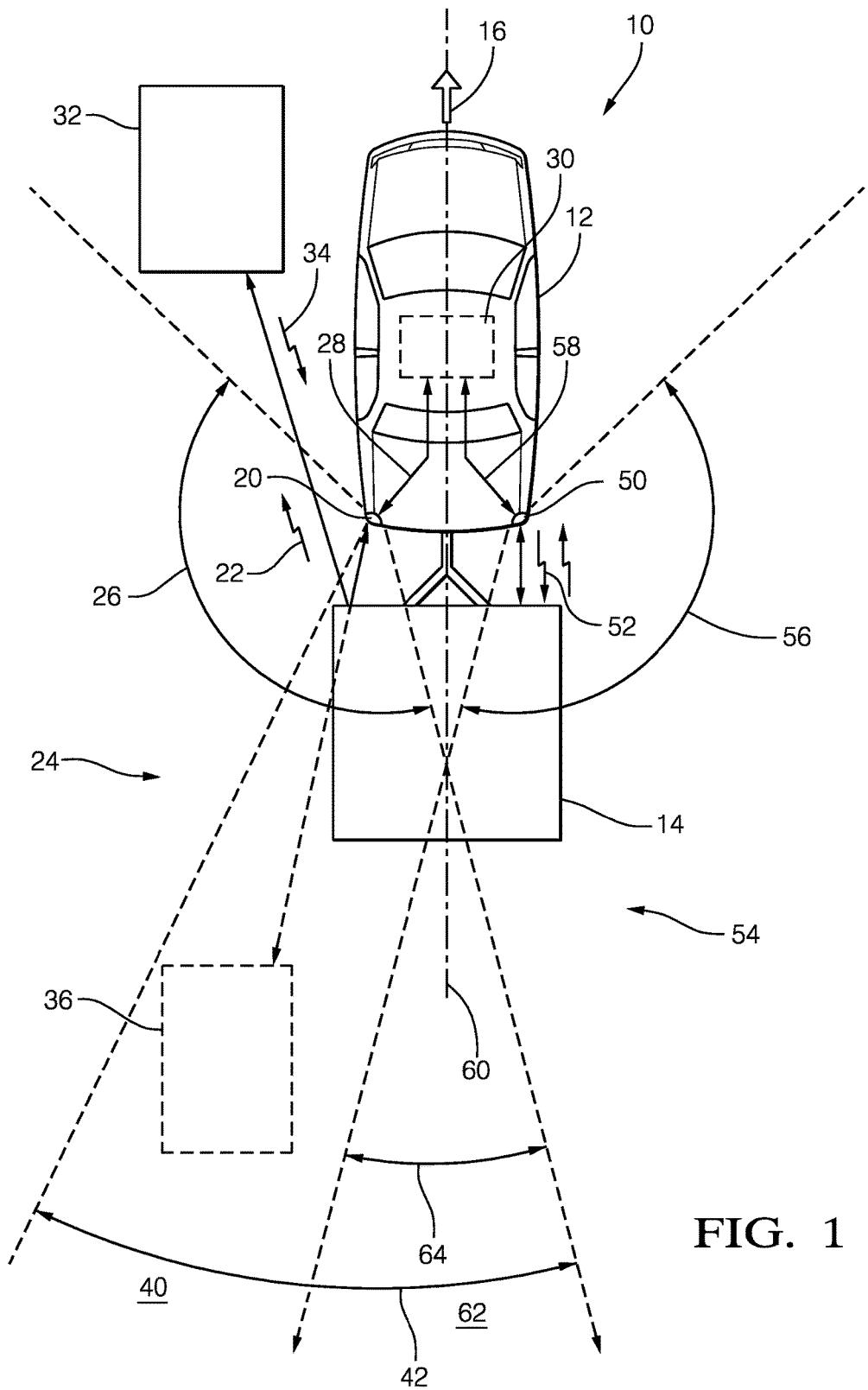
FIG. 1 is diagram of a scenario where a radar object detection system detects a target in accordance with one embodiment.

FIG. 1 illustrates a non-limiting example of a radar object detection system, hereafter the system 10, configured to detect targets proximate to a vehicle 12. By way of example and not limitation, the targets may be automobiles, trucks, motorcycles, or any other type of vehicle traveling on a roadway proximate to the vehicle 12. As will be explained in more detail, the system 10 described herein provides for improved performance with regard to false-alerts. False-alerts can be generally characterized as instances when prior examples of radar object detection systems issued alerts indicating that, for example, another vehicle was close to or approaching the vehicle 12, when in fact no other vehicle was present where the prior system indicated. In particular, the system 10 described herein reduces or eliminates instances of false alerts when the vehicle 12 is towing a trailer 14, the combination of which would typically be traveling in a forward direction as indicated by arrow 16.

The system 10 includes at least one radar sensor, for example a first sensor 20 that emits a first radar signal 22 toward a first area 24 about a vehicle 12. In this non-limiting example, the first area 24 is bounded by the dashed lines indicated by a first arc 26. That is, if the field-of-view of the first sensor 20 is not obstructed by, for example, the trailer 14, the first sensor should be able to detect objects anywhere in the first area 24 indicated or swept by the first arc 26. The first sensor 20 also generally configured to output a first signal 28 indicative of detected targets detected by the first sensor 20 proximate to the vehicle 12.

If the trailer 14 is being towed by the vehicle 12, the trailer 14 may reflect the first radar signal 22 emitted by the first sensor 20 to a location that may be outside of the field-of-view of the first sensor 20. In this non-limiting example, the first radar signal 22 is shown as being reflected by the trailer 14 toward an actual-target 32, and a return signal 34 travels along a similar path and is reflected by the trailer 14 toward the first sensor 20. As a result, the system 10 may interpret the first signal 28 which is based on the return signal 34 as an indication that an object or other vehicle is present illustrated as a false-target 36. That is, the system 10 determines that something is present at the location indicated by the false-target 36, when actually nothing is there. It is recognized that the trailer 14 does not necessarily act like a perfect mirror as suggested in this example, and that the trailer 14 may cause other forms of radar signal distortion or redirection that results in other false alert scenarios.

The system 10 also includes a controller 30 that receives the first signal 28 from the first sensor 20. The controller 30 may include a processor (not shown) such as a microprocessor or other control circuitry such as analog and/or digital control circuitry including an application specific integrated circuit (ASIC) for processing data as should be evident to those in the art. The controller 30 may include memory (not shown), including non-volatile memory, such as electrically erasable programmable read-only memory (EEPROM) for storing one or more routines, thresholds and captured data. The one or more routines may be executed by the processor to perform steps for determining if signals received by the controller 30 should be classified as an actual target or a false target as described herein.

To this end, the controller 30 is configured to determine when the trailer 14 is connected to the vehicle based on the first signal 28. By way of example and not limitation, a way to determine that a trailer is connected to a towing vehicle is described in U.S. patent application Ser. No. 14/454,754 filed 8 Aug. 2014 by Cashler et al., which also teaches how to determine the size (e.g. width and length) of the trailer 14. Alternatively, a back-up camera (not shown) could be used alone or in combination with the system 10 to determine the presence and size of the trailer 14.

Once the size of the trailer 14 is known, the controller 30 is further configured to determine or define an occlusion-zone or a shadow-zone 40 bounded by the dashed lines indicated by a second arc 42. That is, the shadow-zone 40 corresponds to a first portion of the first area 24 obstructed by the trailer 14 from being viewed by the first sensor 20. In order to reduce or prevent instances of false alerts, the controller 30 is further configured to ignore instances when detected targets that are indicated by the first signal as being present or located within the shadow-zone 40. In this way, instances when the trailer 14 reflects the first radar signal 22 and the return signal 34 to and from the actual target 32 are not interpreted or indicated to the operator of the vehicle 12 as being present, for example, at the location where the false-target 36 is illustrated.

Figure 2:
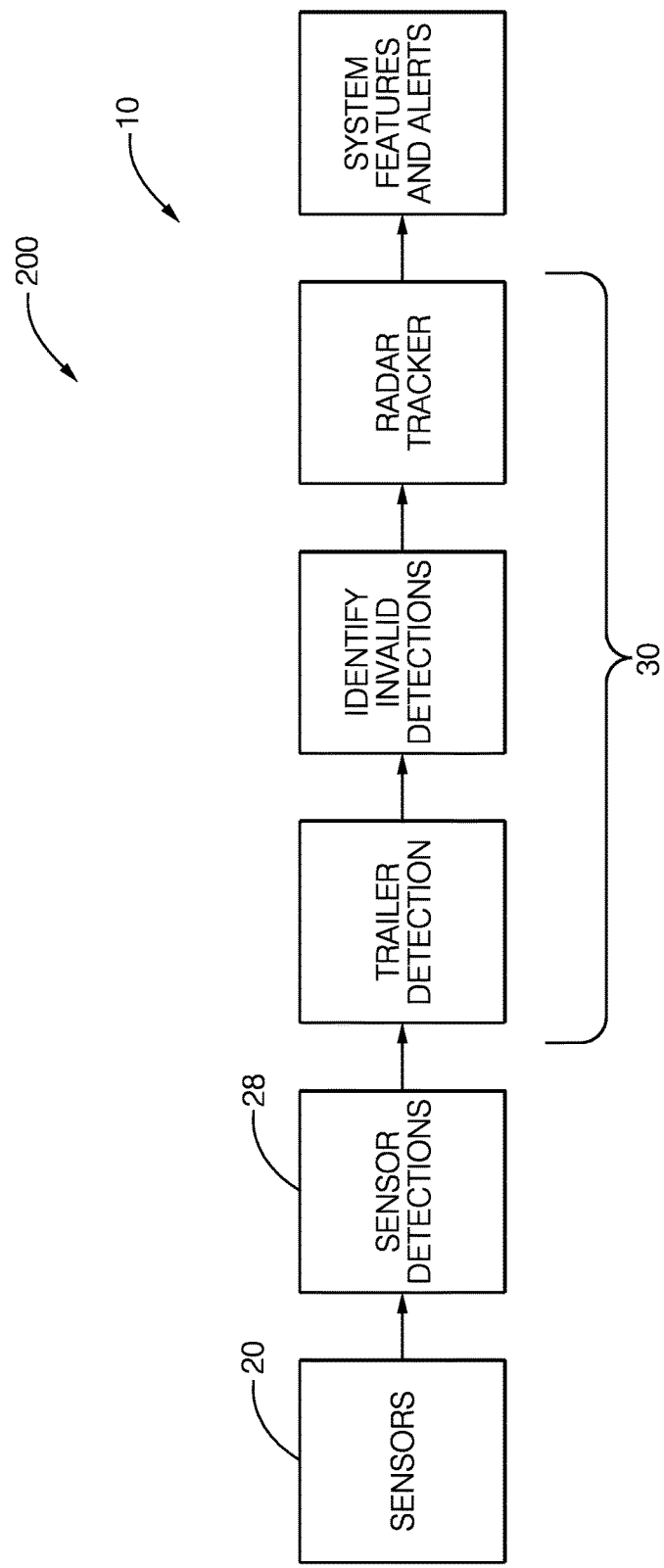
FIG. 2 is chart of a signal processing path of the system of FIG. 1 in accordance with one embodiment.

FIG. 2 illustrates a non-limiting example of a signal processing flow chart, hereafter the chart 200. The block labeled Sensors generally corresponds to one or more radar sensors connected to the controller 30, e.g. the first sensor 20 or other radar sensors present in the system 10. The Sensor Detections block generally corresponds to signals output by the radar sensors, e.g. the first signal 28. An improvement present in the system 10 over prior examples of radar object detection systems is that an additional detection screen (e.g. the Identify Invalid Detections block) is provided that flags these invalid detections prior to the Radar Tracker block processing which allows the Radar Tracker to disregard invalid detection when forming radar-tracks. This controller 30 sets a trailer presence flag to indicate that detections behind the vehicle 12 may be invalid and should not be used to create radar tracks. If a target is detected and deemed to be an actual target proximate to the vehicle, the System Features and Alerts block may illuminate an indicator that indicates what side of the vehicle 12 the actual target is located, and may sound a chime or other audible alert.

However, it is useful to retain radar track information associated with the trailer itself. A track that forms from the trailer 14 can easily be identified as part of the trailer 14 and disregarded by the system 10. This tracking of the trailer 14 may be useful when the vehicle 12 is turning. As a turn is made, the trailer 14 will swing out from behind the vehicle 12, and create tracks from detections that are no longer within the shadow-zone 40. If a track has been identified as part of the trailer 14 when the trailer 14 swings out, the track will follow and any new detection created by the change in the trailer profile can be associated with the existing track that is already known as part of the trailer and disregarded by the feature. To allow this, in addition to the exclusion angle an exclusion range no greater than the trailer length is implemented to preserve the trailer information but eliminate the unwanted false tracks.

In prior examples of radar object detection systems, all detection data went directly to the Radar Tracker block without any indication of which radar tracks might be invalid because of the shadow zone 40 caused by the trailer. This allowed false or invalid tracks to form and put a burden upon the Radar Tracker to screen out these bad tracks. By eliminating the invalid tracks prior to the Radar Tracker, this greatly reduces the number of false tracks that were caused by the presence of the trailer. In other systems when a trailer is present the features simply turn off. The improvement described herein allows the features to continue to operate by taking into account the presence of the trailer. A key enabler for this invention is the trailer detection algorithm that allows the system to determine the size of the trailer and thereby account for the bad detections.

Referring again to FIG. 1, the system 10 may include an additional, distinct radar sensor such as a second sensor 50 that emits a second radar signal 52 toward a second area 54 defined by a second arc 56 which defines a field-of-view of the second sensor 50 different from the first area 24, and outputs a second signal 58 indicative of detected targets proximate to the vehicle 12. The controller 30 may be further configured to receive the second signal 58 from the second sensor 50, and further configured to determine when the trailer 14 is connected to, or being towed by, the vehicle 12 based on the first signal 28 and the second signal 58. By way of example and not limitation, the second area 54 may be a mirror image of the first area 24, where the mirror image is taken about a longitudinal axis 60 of the vehicle 12.

With signals from two radar sensors (the first signal 22 and the second signal 52) the controller 30 may be further configured to redefine or reduce the size of the shadow-zone 40 to correspond to an intersection area 62 where the first portion of the first area 24 intersects with a second portion of the second area 54. It is noted that the intersection area 62 is obstructed by the trailer 14 from being viewed by both the first sensor 20 and the second sensor 50. The non-limiting example of the intersection area 62 in FIG. 1 is defined by a third arc 64. Since targets indicated by one radar sensor can be paired with targets indicated by the other radar sensor, the controller 30 can be further configured to ignore detected targets within the shadow-zone, i.e. the intersection area 62, that are indicated by only one of the first signal 22 and the second signal 52. That is, if both the first signal 22 and the second signal 52 indicate a target at the same location, the controller 30 may classify that target as an actual target.

It has been observed that targets can be detected traveling behind the trailer 14. While not subscribing to any particular theory, it is thought that radar signals may propagate along the ground underneath the trailer 14 so objects behind the trailer 14 can be detected. If a target is indicated by both the first signal 22 and the second signal 52, it is thought to be unlikely that the actual target being detected is traveling directly forward of the vehicle 12, and so may actually be present directly behind the trailer 14.

Accordingly, a radar object detection system (the system 10), and a controller 30 for the system 10 is provided. The features of the system 10 or the controller 30 provide for reduced instances of false alerts when the vehicle 12 is towing the trailer 14.

While this invention has been described in terms of the preferred embodiments thereof, it is not intended to be so limited, but rather only to the extent set forth in the claims that follow.

I claim:

1. A radar object detection system, said system comprising:
a first sensor configured to emit a first radar signal toward a first area about a vehicle and output a first signal indicative of detected targets in the first area;
a second sensor configured to emit a second radar signal toward a second area that is different from and at least partially overlapping the first area and output a second signal indicative of detected targets in the second area; and
a controller configured to receive the first signal from the first sensor and the second signal from the second sensor, determine when a trailer is connected to the vehicle based on the first signal and the second signal, define a shadow-zone that corresponds to an intersection area defined by an intersection of a first portion of the first area obstructed by the trailer from being viewed by the first sensor and a second portion of the second area obstructed by the trailer from being viewed by the second sensor, and classify detected targets within the shadow-zone that are indicated by only one of the first signal and the second signal as false targets.

2. The system in accordance with claim 1, wherein the first sensor and the second sensor are arranged such that the second area is a mirror image of the first area taken about a longitudinal axis of the vehicle.

\* \* \* \* \*